United States Patent [19]

Talonen

[11] Patent Number: 4,945,612
[45] Date of Patent: Aug. 7, 1990

[54] SYSTEM AND A METHOD FOR JOINING THE ENDS OF A BAND-SHAPED ELONGATE ELEMENT

[75] Inventor: Tauno Talonen, Tampere, Finland

[73] Assignee: Tamfelt OY AB, Tampere, Finland

[21] Appl. No.: 264,273

[22] PCT Filed: Jun. 4, 1987

[86] PCT No.: PCT/FI87/00077
§ 371 Date: Oct. 14, 1988
§ 102(e) Date: Oct. 14, 1988

[87] PCT Pub. No.: WO87/07664
PCT Pub. Date: Dec. 17, 1987

[30] Foreign Application Priority Data

Jun. 13, 1986 [FI] Finland .................. 862540

[51] Int. Cl.$^5$ .......... D21F 1/12; D21F 7/10; F16G 3/04
[52] U.S. Cl. ............ 24/31 R; 24/31 F; 29/423; 29/464; 29/467
[58] Field of Search ............ 24/31 F, 31 C, 31 B, 24/31 R, 460, 31 L, 31 H, 31 W, 31 V, 32, 33 R, 33 A, 33 F, 33 P, 33 V, 33 L, 33 B, 33 C, 33 K, 33 M, 34, 35, 36, 37, 38, 39; 474/255, 257; 29/281.5, 464, 467, 437, 434, 423

[56] References Cited

U.S. PATENT DOCUMENTS

| | | | |
|---|---|---|---|
| 1,033,774 | 7/1912 | Andres et al. | 24/31 F |
| 1,774,807 | 9/1930 | Mildren | 24/31 F |
| 2,324,171 | 7/1943 | Paradise | 24/31 F X |
| 3,274,707 | 9/1966 | Garden | 24/31 F X |

FOREIGN PATENT DOCUMENTS 435207 9/1984 Sweden .

Primary Examiner—James R. Brittain
Attorney, Agent, or Firm—Lowe, Price, LeBlanc, Becker & Shur

[57] ABSTRACT

A system and method are provided for joining the ends of a bank-shaped elongate element. Alignment strips (3) are thereby fastened in the vicinity of the ends (1,2) of the elongate element, both alignment strips being formed by a sheet-like part (4) one edge of which is provided with a U-shaped element (5). In order to provide a firm joint, the alignment strips are positioned side by side so that the outer surfaces of the bottoms of the U-shaped elements (5) are in alignment. The alignment strips (3) so positioned are interlocked by means of a locking strip (7) to be passed in place from a side of the band-shaped elongate element in the longitudinal direction of the alignment strips (3) so as to be engaged with the U-shaped elements (5).

9 Claims, 3 Drawing Sheets

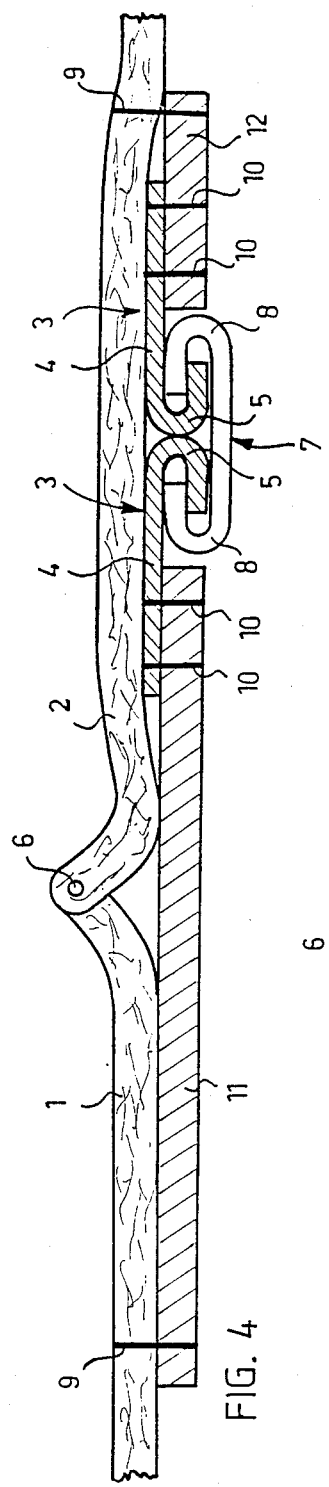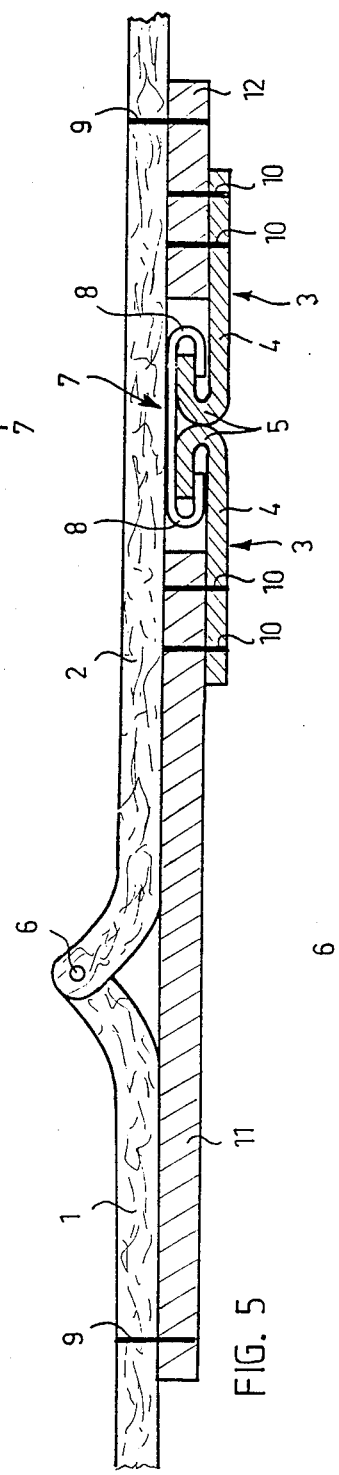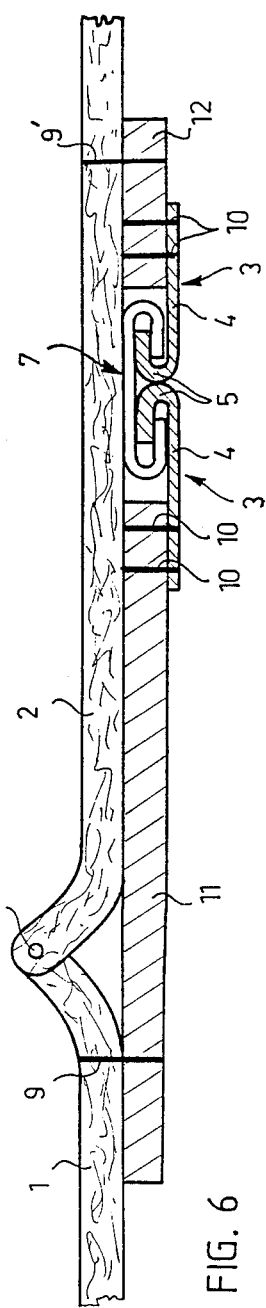

SYSTEM AND A METHOD FOR JOINING THE ENDS OF A BAND-SHAPED ELONGATE ELEMENT

FIELD OF THE INVENTION

This invention relates to a system and a method for joining the ends of a band-shaped elongate element and, more particularly, to a system and a method wherein alignment strips are fastened in the vicinity of the ends of the elongate element, both alignment strips being formed by a sheet-like part one edge of which is provided with a U-shaped element.

BACKGROUND OF THE PRIOR ART

Methods and systems of the above type are well-known in various technical fields, for joining the ends of a band-shaped product into an endless band. Such technical fields include wood processing industries in which endless wires and felts are used, e.g., for drying paper webs in paper machines. Cellulose and paper board machines are further known applications.

The joining of the ends of a band-shaped product, such as a wire or felt, is of essential importance in wood processing industries in particular, since wires or felts woven endless are always very difficult to mount in place due to the fact that it is necessary to disassemble the supporting structure of the rolls on one side to be able to place the wire or felt in a paper machine, for instance. The disassembly and assembly of such structures is difficult, and plenty of room is required at the side of the machine as the wire or felt is mounted from the side. Furthermore, endless felts and wires are heavy and large, wherefore they are difficult to handle.

For this reason, it is customary to weave the wire or felt into a band-shaped product the ends of which are not joined until in the machine. It is thereby possible to draw the wire or felt on the rolls in the operating direction of the machine. Various methods and arrangements have been developed for temporarily joining the ends of the wire or felt e.g. in a paper machine After the temporary joining, a permanent joint is formed and the temporary joint is opened.

Known solutions include the method and means disclosed in Swedish Published Specification 435,207 for joining the ends of a band-shaped product. This known solution utilizes a so called zipper principle, whereby ribbons are fastened adjacent to the ends of the product to form the zipper halves The ends of the product can thereby be joined by means of a connecting slide which functions in the same way as a conventional zipper slide. After the forming of the temporary joint, the proper joint is formed e.g. by passing a joint thread through loops provided at the ends of the product. The zipper parts are naturally removed after the permanent joint is completed.

Another example of known solutions would be the device disclosed in Finnish Patent Application 840,804. In this known solution the ends of a band-shaped product are provided with interlocking clasp means by means of which the ends are joined temporarily. After the temporary joint has been formed in this way, the permanent joint is formed e.g. in a manner described in connection with the preceding known solution. After the permanent joint has been formed, the clasp means are removed from the band-shaped product.

A disadvantage of these known solutions is, for instance, that the locking of the ends of the band-shaped product may open when used as an aid in the mounting. A further disadvantage is that the adjustment is difficult, i.e. the two sides of the joint are difficult to get properly in alignment, wherefore the joint thread or wire is difficult to pass in place. In addition, if the joint is not quite straight, the joining is difficult to be carried out by means of known solutions. Also, the use of known solutions is difficult and laborious, as a result of which the change of a felt, for instance, is slow. Prior solutions are suitable for temporary joining only, whereby the permanent joint always has to be made by means of different joining means.

The object of the invention is to provide a method and an arrangement for joining the ends of a band-shaped product, which avoid the disadvantages of the prior art. This is achieved by means of a method according to the invention which is characterized in that the alignment strips are positioned side by side in such a way that the outer surfaces of the bottoms of the U-shaped elements are in alignment and that the alignment strips so positioned are interlocked by means of a locking strip to be passed in place from the side of the band-shaped product in the longitudinal direction of the alignment strips so as to get engaged with the U-shaped elements. An arrangement according to the invention, in turn, is characterized in that the arrangement comprises a locking strip provided with two members arranged to simultaneously engage with the U-shaped elements of the alignment strips positioned side by side with the outer surfaces of the bottoms of the U-shaped elements in alignment, thus locking the alignment strips to each other.

An advantage of the solution according to the invention is above all that the locking is simple as it can be effected from the side of the machine so that the locking strip automatically draws together the ends of the product. A further advantage is that the joint cannot open after the locking, not even when the product is loose. The invention can also be used for providing a permanent joint in drying felts, for instance. A raising element according to one embodiment of the invention makes it easier to align the ends of the product and to pass the joint thread in place, which substantially reduces the time required for the mounting of a felt, for instance, in the machine, and expensive down times are shortened. The invention, can be advantageously applied with different kinds of products, since the alignment strips and the locking strip can be dimensioned according to the properties of the product to be joined. By means of the invention it is also possible to join curved ends in an extremely advantageous manner.

BRIEF DESCRIPTION OF THE DRAWINGS

The invention will be described in the following in more detail by means of some preferred embodiments described in the attached drawing, wherein FIG. 4 illustrates a fourth embodiment of the realization of FIG. 1, FIG. 5 illustrates a fifth embodiment of the realization FIG. 1, FIG. 6 illustrates a sixth embodiment of the realization FIG. 1.

DESCRIPTION OF THE PREFERRED EMBODIMENTS

Figure 1:
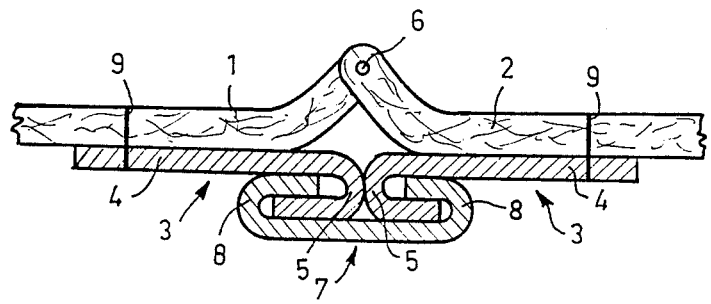
FIG. 1 is a general side view of a joint realization according to the invention.

FIG. 1 shows generally a joint formed by means of the method according to the invention. In the example of FIG. 1, the ends of a band-shaped product, such as a felt, are indicated by means of the reference numerals 1 and 2. Alignment strips are indicated by means of the reference numeral 3 in FIG. 1. The alignment strips 3 are formed by a sheet-like part 4 and a U-shaped element 5 formed to one edge of the sheet-like part 4. Further, a joint thread forming a permanent joint is indicated by means of the reference numeral 6 in FIG. 1. The joint thread 6 is passed through loops provided on the edges of the ends 1, 2.

According to the method according to the invention the alignment strips 3 are fastened to the ends of the band-shaped product e.g. by sewing so that they are positioned side by side with the outer surface of the bottoms of the U-shaped elements in alignment, i.e. the outer surfaces of the bottoms are positioned opposite to each other either in contact or at a predetermined distance from each other. The alignment strips so positioned are interlocked by means of a locking strip 7 which is passed in place from the side of the band-shaped product in the longitudinal direction of the alignment strips 3 so that it is engaged with the U-shaped elements 5.

In the embodiment of FIG. 1 the locking strip 7 is provided with two members 8 which are arranged to simultaneously engage with the U-shaped elements 5 of both alignment strips 3. In the example of FIG. 1, the members 8 are formed by U-shaped branches, so that when the locking strip is pushed in place from the side of the band-shaped product, it draws the locking strips into a position shown in FIG. 1, whereby the ends 1, 2 of the band-shaped product are positioned side by side so that the joint thread 6 can be passed in place. The ends 1, 2 are thereby in an unstressed state, since the tensile stresses of the band-shaped product are transmitted through seams 9 to the alignment strips 3, which are interlocked by means of the locking strip 7.

Figure 2:
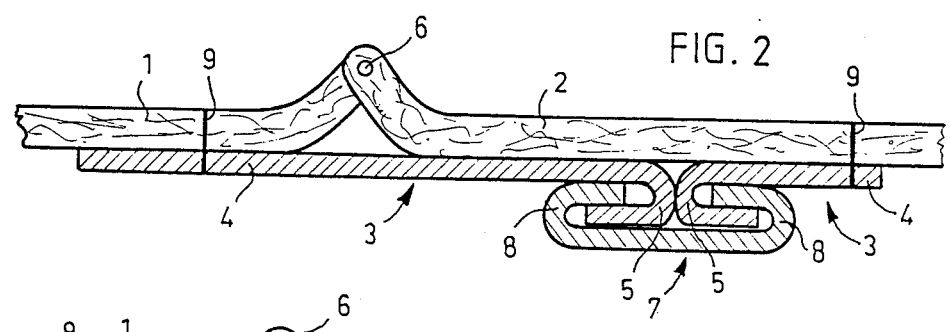
FIG. 2 illustrates another embodiment of the realization of FIG. 1.
Figure 3:
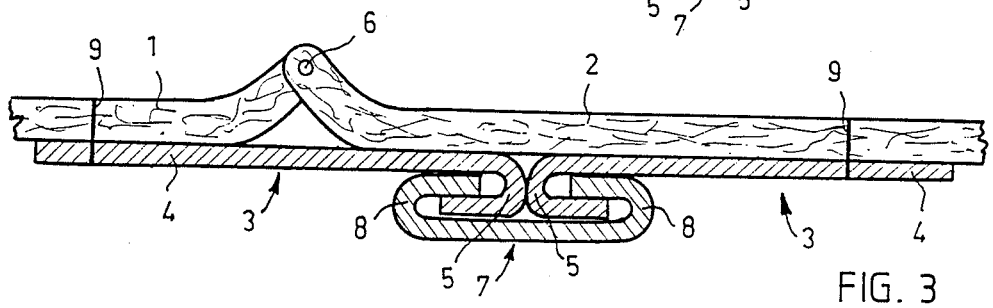
FIG. 3 illustrates a third embodiment of the realization of FIG. 1.

The length of the sheet-like parts of the alignment strips 3 in the longitudinal direction of the product can be chosen as desired according to the requirements in each particular case. FIGS. 2 and 3 show two embodiments in which the sheet-like parts 4 of the alignment strips are unequal in length. If required, the locking strip 7 can be positioned apart from the permanent joint, as is the case in the examples of FIGS. 2 and 3.

The length of the sheet-like parts 4 in the longitudinal direction of the longitudinal element may also vary otherwise than as illustrated in the examples of FIGS. 2 and 3. FIGS. 4 to 7 show some of these embodiments. The sheet-like parts 4 of the alignment strips 3 may thereby be equal in size, but it is possible to attach extension plates 11, 12 of desired size to the sheet-like parts 4 by means of seams 10, for example. In such embodiments the alignment strips 3 are fastened adjacent to the ends 1, 2 by means of the seams 9 sewn in the extension plates 11, 12 and the ends 1, 2.

The embodiments shown in FIGS. 4 and 5 differ from each other only with respect to the position of the alignment strips 3. In the method according to the invention the alignment strips 3 can be arranged in the two positions shown in FIGS. 4 and 5; the only essential thing is that the U-shaped elements should be positioned so that the outer surfaces of their bottoms are in alignment, as mentioned above.

Figure 7:
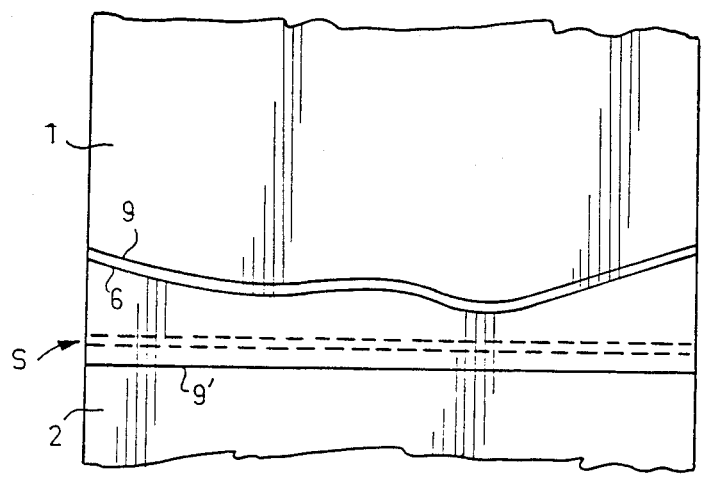
FIG. 7 is a top view of the embodiment of FIG. 6.

The example of FIGS. 6 and 7 shows how the method according to the invention can be applied in cases where the ends of the band-shaped product are not straight. The permanent joint is curved in this case. By giving one extension plate 11 a suitable width, the alignment strips 3 can be fastened to the ends of the band-shaped product in an extremely advantageous manner. The extension plate 11 is thereby fastened to the end 1 by means of the seam 9 substantially parallel with the permanent joint, and the extension plate 12 in turn by means of a straight seam 9'. By means of the locking strip 7 the ends 1, 2 can be locked in a position shown in FIGS. 6 and 7, whereby the joint thread 6 can be easily passed in place. In FIG. 7 the reference S indicates the temporary joint formed by the alignment strips 3 and the locking strip 7.

Figure 8:
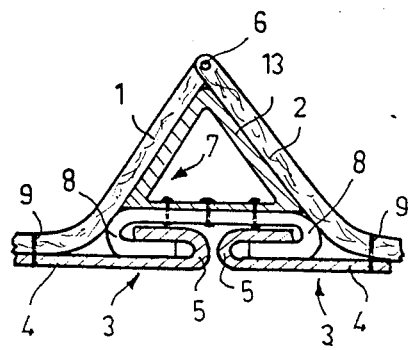
FIG. 8 illustrates another embodiment of the method according to the invention.
Figure 9:
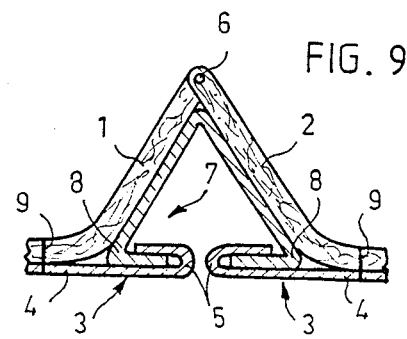
FIG. 9 illustrates a further application of the embodiment of FIG. 8.

All the above embodiments are illustrative of cases in which a temporary joint is made for the formation of a permanent joint. The permanent joint is made e.g. by means of the joint thread 6. Accordingly, the alignment strips are fastened removeably to the ends 1, 2 of the band-shaped product and they are removed after the formation of the permanent joint. Since the joining of the ends is carried out in the machine at the client factory after the band-shaped product has been drawn into the machine, it is of advantage that the permanent joint can be made in circumstances as advantageous as possible. Extremely advantageous circumstances for the formation of the permanent joint can be obtained by raising the ends 1, 2 of the band-shaped product upwards in the area of the locking strip 7. This can be effected e.g. by forming the locking strip so that it acts as a part which raises the ends 1, 2 of the band-shaped product. FIGS. 8 and 9 show two such embodiments. By means of the embodiments of FIGS. 8 and 9 the loops used for the formation of the permanent joint can be brought into a position extremely advantageous in view of the passing in place of the joint thread 6, so that the permanent joint can be formed rapidly.

Figure 10:
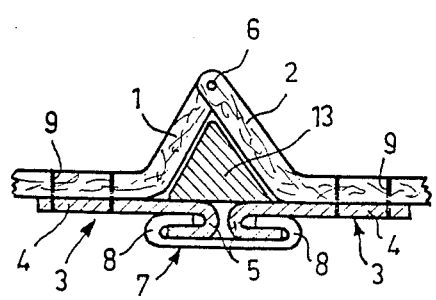
FIG. 10 illustrates a further application of the embodiment of FIG. 8.

One and the same locking strip 7 can be used e.g. in the embodiments of FIGS. 1 and 8. In the embodiment of FIG. 8 the locking strip raising the ends 1, 2 of the band-shaped product is thereby made of the locking strip used in the embodiment of FIG. 1 by removeably fastening a separate raising element 13 having e.g. a triangular cross-section to the strip. It is thereby possible to raise the ends even though the locking strip would already have been passed in place, if it is noticed that it would be advantageous to slightly raise the ends, e.g. in the case of FIG. 1, irrespective of the fact that this was at first considered to be unnecessary, so that the raising element was removed from the locking strip 7 before it was passed in place. The raising element 13 can thereby be inserted between the alignment strips 3 and the ends 1, 2 of the band-shaped product in a manner shown in FIGS. 10 and 11. The passing of the joint thread 6 can thereby be effected under advantageous circumstances without having to replace the locking strip with a strip capable of raising the ends.

Figure 11:
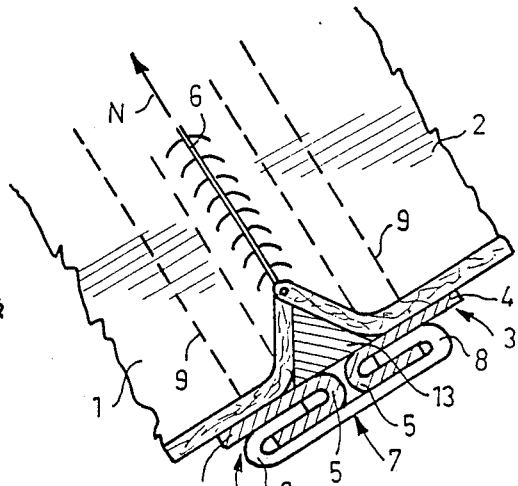
FIG. 11 is a perspective view of one preferred realization of the embodiment of FIG. 10.

Unlike the alignment strips the raising element 13 does not necessarily have to extend over the entire width of the band-shaped product, but it is possible to use a short raising element 13 which is displaced in the direction of the permanent joint in proportion as the joint thread 6 is passed in place. This is illustrated in FIG. 11 by means of the arrow N. After the permanent joint is formed, the alignment strips 3 are removed from the band-shaped product, whereafter the product, such as a felt, is ready for operation.

Figure 14:
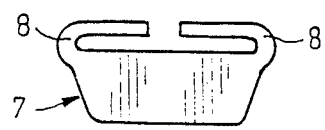
FIG. 14 illustrates one possible embodiment of the locking strip.

The locking strip can, of course, be shaped as desired according to the special requirements in each particular case. FIG. 14 shows one possible embodiment in the locking strip 7.

Figure 12:
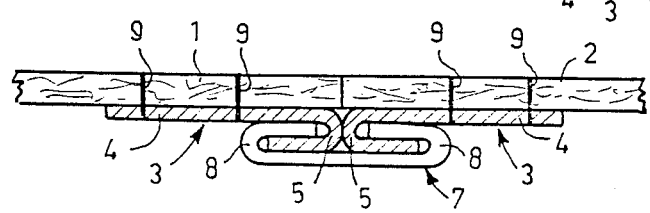
FIG. 12 is a general side view of a permanent joint application of the joint formed by means of the invention.
Figure 13:
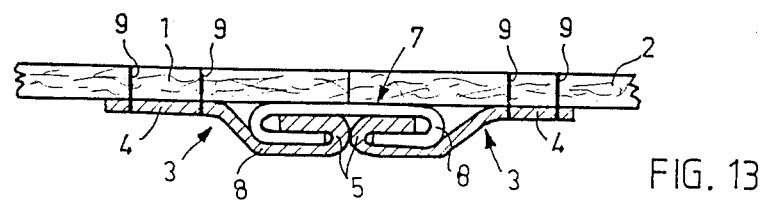
FIG. 13 illustrates another embodiment of the application of FIG. 12.

The method and the arrangement according to the invention can also be used for the formation of a permanent joint. Such an embodiment is possible e.g. in connection with drying felts, whereby the joint formed by the locking strip and the alignment strips moves with the felt during the operation of the machine. FIGS. 12 and 13 show this type of embodiments. The same reference numerals as in the preceding examples have been used in FIGS. 12 and 13 at corresponding points, since the formation of the joint as well as the means used correspond to the formation of a temporary joint described above.

The embodiments described above are by no means intended to restrict the invention, but the invention may be modified within the scope of the claims in various ways. Accordingly, it is obvious that the different parts of the arrangement according to the invention do not need to be exactly similar to those shown in the figures, but other kind of parts are possible as well. The raising element 13 can be fastened removeably to the locking strip in any suitable manner, e.g. by a snap-action joint, screws, U-shaped fastening means, etc. U-shaped fastening means are particularly advantageous when a short raising element is used which is displaced in proportion as the permanent joint is formed. The raising element may thereby be displaced similarly as a slide on the locking strip. The alignment strips and the locking strip can be made of any material; advantageous results being obtained e.g. by means of plastic parts. The raising element can also be made of any suitable material, e.g. plastic or wood. The material of the extension plates, in turn, may be rigid or soft, such as wood, plastic, metal, cloth, felt, wire etc. The alignment strips can be fastened in the area of the ends of the band-shaped product in any suitable manner, e.g. by sewing, as in the example of the figures, or by riveting, etc.

I claim:

1. A method for temporarily joining the ends of a band-shaped elongate element, comprising the steps of:
   fastening a pair of alignment strips each at a predetermined short distance from the respective two ends of the elongate element, both alignment strips being formed with a sheet-like part one edge of which is provided with a U-shaped element, the alignment strips being positioned side by side so that the outer surfaces of the bottoms of said U-shaped elements are in alignment and the alignment strips are positioned so as to be interlocked;
   passing a locking strip from one side of the band-shaped elongate element in a longitudinal direction of said alignment strips so as to engage with said U-shaped elements, so as to enable a permanent joint to be formed between said ends of said elongate element; and
   permanently joining said ends of said elongate element directly to each other by known means and thereafter removing said alignment strips and said locking strip from said permanently joined ends.

2. A method according to claim 1, wherein:
   the respective ends of the elongate element, adjacent to the corresponding locking strips, are held away therefrom to facilitate said step of permanently joining said ends.

3. Apparatus for facilitating permanent joining of the ends of a band-shaped elongate element into an endless band after placement of said elongate element into approximately its useful position in a machine suitable for processing wood or cellulose products, for use of the joined elongate element after removal of said temporarily, attached apparatus therefrom, comprising:
   a pair of alignment strips, temporarily fastened at a predetermined distance from the respective ends of said elongate element after said placement thereof, each alignment strip being formed with a sheet-like part one edge of which is provided with a U-shaped element having two arms one of which is temporarily fastened to said elongate element and the other of which lies outwardly of the elongate element such that the ends of the elongate element are disposed to make contact with each other for formation of said permanent joining thereat; and
   a locking strip provided with two members, arranged to simultaneously engage with said outwardly lying arms of the U-shaped elements of said pair of alignment strips when the alignment strips are positioned side by side with the outer surfaces of bottom portions of their U-shaped elements placed in alignment for thereby temporarily locking said alignment strips to each other so as to hold said respective ends of said elongate element in contact for permanent joining thereof by known means that permanently remain with said joined ends to form said endless band following removal of said alignment strips and said locking strip thereafter from said permanently joined ends.

4. Apparatus according to claim 3, wherein:
   said members of the locking strip comprise two U-shaped branches provided on two longitudinal side edges of the locking strip, the locking strip being formed to be passed in placed from one side of said elongate element in the longitudinal direction of the alignment strips.

5. Apparatus according to claim 3, wherein:
   the locking strip is formed to have a part formed and disposed to hold the ends of the elongate element in contact with each other and away from the respective alignment strips.

6. Apparatus according to claim 5, wherein:
   the part holding away the ends of the elongate element is formed by the locking strip and a raising element formed to be removably attached thereto.

7. Apparatus according to claim 6, wherein:

said part holding away the ends of the elongate element has a generally triangular cross-section having a first side contacting said locking strip at an outer longitudinal surface thereof and second and third sides respectively contacting end portions of that surface of said elongate element to which said alignment strips are fastened such that said ends of said elongate element contact each other at an apex formed by said second an third sides.

8. Apparatus according to claim 3, wherein:
said locking strip has a generally hollow triangular section of which two sides meet at a predetermined angle to form an apex and a third side has a longitudinally aligned cut such that said pair of alignment strips is engaged by said locking strip at said cut and end portions of said elongate element are held by said two sides to form said contact thereof at said apex.

9. Apparatus according to claim 3, further comprising:
an end-holding element of triangular section having a base and two sides meeting at a predetermined angle to form an apex opposite said base, said end-holding element being disposed with said base contacting said alignment strips at an outer surface of each away from said locking strip engaging the same and end surface portions of said elongate element being held by said two sides so as to make said contact at said apex for said permanent jointing to be formed thereat.

* * * * *